United States Patent [19]
Lindblom

[11] 3,901,652
[45] Aug. 26, 1975

[54] APPARATUS FOR PROCESSING AND TREATING FELLED TREES

[75] Inventor: Karl Thore Lindblom, Alfta, Sweden

[73] Assignee: Ostbergs Fabriks AB, Alfta, Sweden

[22] Filed: Sept. 13, 1973

[21] Appl. No.: 397,046

[52] U.S. Cl. .................. 21/63; 144/2 Z; 144/3 D
[51] Int. Cl. .......................................... B27k 3/02
[58] Field of Search ........ 21/62, 63, 73, 7; 118/320; 144/2 Z, 3 D, 34 E, 309 AC, 208 R, 208 E

[56] References Cited
UNITED STATES PATENTS

| | | | |
|---|---|---|---|
| 218,659 | 8/1879 | Bouvier | 47/57.5 |
| 2,870,573 | 1/1959 | Scadden | 47/8 U X |
| 3,121,974 | 2/1964 | Brantley et al. | 47/12 |
| 3,286,402 | 11/1966 | Newton | 21/73 X |
| 3,343,575 | 9/1967 | Trout | 47/12 |
| 3,596,690 | 8/1971 | Hamilton et al. | 144/3 D X |
| 3,797,541 | 3/1974 | Kurelek et al. | 144/3 D |

FOREIGN PATENTS OR APPLICATIONS
139,935   4/1903   Germany

*Primary Examiner*—Morris O. Wolk
*Assistant Examiner*—Arnold Turk
*Attorney, Agent, or Firm*—Fred Philpitt

[57] ABSTRACT

An apparatus for processing felled trees, wherein the trees are advanced in the longitudinal direction by feed rolls with friction-increasing gripping members, such as spikes, on the roll surface is characterized in that it includes nozzles, which in synchronysm with the feeding of the tree by the feed rolls, spray out a liquid to protect the wood against blue-stain fungus or the like at least in those parts of the tree stem surface which have been depressed by the gripping members. The nozzles are stationed about the passage for the tree stem and are directed radially relative thereto, preferably in a plane downstream of the feed rolls. Preferably at least three of these nozzles are provided.

1 Claim, 1 Drawing Figure

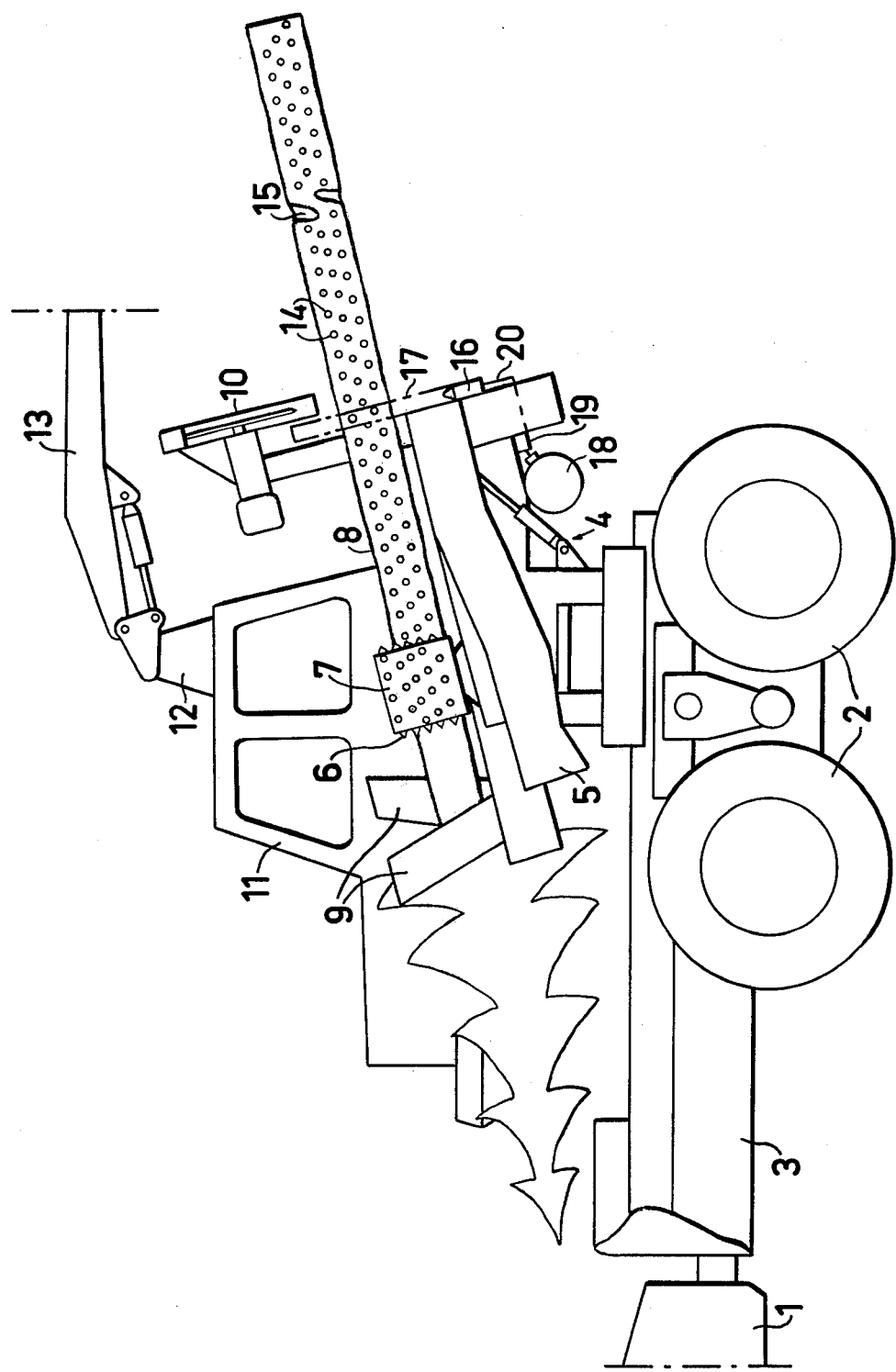

APPARATUS FOR PROCESSING AND TREATING FELLED TREES

This invention relates to an apparatus for processing felled trees.

As soon as a tree is felled, spores insect-borne and suspended in the air and spores being already on the bark start to penetrate through the bark and finally attack the tree, thereby giving rise to blue-stain fungus which destroys the sapwood. Blue-stain fungus can be counteracted by spraying a protective liquid. Previously, when the tree was delimbed manually with tools, the timber was sprayed by hand in conjunction with the stacking of the timber for transport. This manual method was applied also in conjunction with the now usual processing of felled trees by machines. It was observed, however, that this mechanical processing involves a greater risk of blue-stain fungus, due to the fact, that the bark is scraped off by the handling of the timber, for example by the grapples of the loading equipment, but primarily because the bark is pierced through by the spikes (or corresponding gripping members) provided on the rolls for advancing the tree to the place where it is delimbed (and/or subjected to another processing operation). By this penetration the spore attack is accelerated to a very high degree.

It is an object of the present invention to alleviate the problems mentioned above and accordingly the invention provides, in one aspect, an apparatus for processing felled trees, which apparatus comprises feed rolls having friction increasing gripping members thereon for engaging the tree stem surface and advancing the felled trees in their longitudinal direction and wherein the apparatus is characterized by nozzles, which in synchroneism with the feeding of the tree by the feed rolls, are arranged to spray out a liquid to protect the wood against blue-stain fungus or the like at least in those parts of the tree stem surface which have been pierced or depressed by the gripping members of the feed rolls.

The invention is described in greater detail in the following, with reference to the accompanying drawing, which shows in a schematic manner a lateral view of a processing mechine equipped with the device according to the invention.

The shown machine is of the known mobile type which is coupled to a traction vehicle, indicated at 1, or constitutes the rear part of a vehicle combination with central direction control. The processing unit proper, generally designated by 4, is mounted on the underframe 3 supported on bogie wheels 2. Said underframe comprises a pivotal frame structure 5, which in known manner supports a pair of feed rolls 7 with spikes 6 for drawing the tree 8 in question through a delimbing unit 9 (only schematically indicated) located upstream of the feed rolls. Downstream of the rolls 7, on the frame structure 5 a slasher 10 is mounted pivotal against the tree stem 8. The underframe 3 further supports a driver's cabin 11 on the roof of which a foundation 12 for a hinged loading arm 13 is mounted, which arm (not shown) terminates in a grapple means for lifting a felled tree in position on the frame structure 5.

The above-described arrangement is previously known in its entirety and not comprised in the present invention. A description in greater detail, therefore, does not seem to be necessary.

The FIGURE indicates (in an exaggerating manner) the holes 14 caused in the surface of the tree stem 8 by the spikes 6 on the rolls 7. At 15, furthermore, the surface damages on the tree stem are indicated which were caused by the grapples. When the timber, after the cross-cutting of the delimbed stems 8, remains lying in the conventional manner for some time in waiting to be transported away and in conjunction therewith to be sprayed with protective liquid, this protective step has scarcely any effect. The bark, as a matter of fact, has been pierced through by the spikes and damaged by the grapples and thereby has already offered a comfortable way to the blue-stain fungus straight into the sapwood. Moreover, after a few hours only, the spike holes begin to close by swelling and thereby prevent the protective liquid applied at a later time from penetrating into the sapwood and there bring about the desired effect.

The present invention, therefore, has as its object to spray protective liquid in direct connection with the delimbing operation. For this purpose, at the embodiment shown, the frame structure 5 is utilized as a holder for a ring of nozzles 16, which surround the path for the tree stem 8 and are directed radially thereto. In the present case, the ring, indicated by dash-dotted lines 17, is located downstream of the feed rolls 7, more precisely at about the place for the slasher 10. The nozzles are supplied from a tank 18 via a valve or pump 19 and a conduit 20. The pump is so synchronized with the stem feed that the flow to the nozzles is stopped when the stem lies still for being cross-cut (for example by using the same drive source for rolls and pump). It would be sufficient in principle with two diametrically opposed nozzles, viz. one on each side of the tree path, as each of the cylindric feed rolls engage by their spikes along only a relatively narrow belt area on the tree stem, which also is cylindric. In practice, however, one cannot disregard the fact that surface damages can be caused accidentally by the delimbing tools around the stem, and therefore the stem should be sprayed substantially uniformly along its entire periphery, i.e. the practical minimum should be three nozzles (with 120° division) with a forceful spraying effect.

The invention is not restricted to the embodiment shown and described. It can possibly be imagined to place the ring of nozzles upstream of the feed rolls, because the protective liquid sprayed on in a uniform manner is taken along to some extent by the spikes when they are being pressed into the stem surface. The individual radially directed nozzles, furthermore, could be replaced by a sprinkler system in the form of a hollow ring with inwardly facing perforations, which then act as nozzles. Still another alternative is to give the spikes proper a hollow design, so that the protective liquid is sprayed out from the interior of the hollow rolls through the points of the spikes. Hereby, however, the protection for the damages caused by the grapples would be less satisfactory.

The embodiments of the invention in which an exclusive property or privilege is claimed are defined as follows:

1. In the known apparatus for processing felled trees which includes:
   a. a main frame,
   b. feed rolls on said main frame having friction increasing gripping members thereon for engaging the trunk of a felled tree and moving said felled tree in a direction generally corresponding to the longitudinal axis of the tree trunk, and c. delimbing means located adjacent said feed rolls for removing limbs from said tree trunk, the improvement which comprises:

1. an array of nozzles disposed annularly around the path which each tree trunk is to follow at a location adjacent to said feed rolls, each nozzle being directed radially toward the line of movement of a tree trunk as it is being fed longitudinally by said feed rolls,
2. means for feeding said nozzles with a liquid to protect the portions of the tree trunk which have been pierced or depressed by the gripping members of the feed rolls against attack by fungus, and
3. means for correlating the spraying of liquid through said array of nozzles with the longitudinal movement of a tree trunk through said feed rolls.

* * * * *